(12) United States Patent
McGraw et al.

(10) Patent No.: US 11,542,817 B1
(45) Date of Patent: Jan. 3, 2023

(54) SYSTEMS AND METHODS FOR PROVIDING FLUID LIGHTENERS WHILE REDUCING DOWNHOLE EMULSIFICATIONS

(71) Applicant: Horizon Mud Company, Inc., Midland, TX (US)

(72) Inventors: Michael McGraw, Midland, TX (US); Tony Farish, Midland, TX (US); Ronnie Farish, Midland, TX (US)

(73) Assignee: Horizon Mud Company, Inc., Midland, TX (US)

(*) Notice: Subject to any disclaimer, the term of this patent is extended or adjusted under 35 U.S.C. 154(b) by 0 days.

(21) Appl. No.: 17/401,227

(22) Filed: Aug. 12, 2021

Related U.S. Application Data (63) Continuation of application No. 17/230,559, filed on Apr. 14, 2021, which is a continuation-in-part of application No. 17/127,814, filed on Dec. 18, 2020, now abandoned.

(51) Int. Cl.
 *E21B 49/08* (2006.01)
 *E21B 21/08* (2006.01)
 *E21B 21/00* (2006.01)

(52) U.S. Cl.
 CPC .......... *E21B 49/088* (2013.01); *E21B 21/001* (2013.01); *E21B 21/08* (2013.01); *E21B 49/0875* (2020.05)

(58) Field of Classification Search
 CPC ....... E21B 21/001; E21B 21/08; E21B 49/088
 USPC ......................................... 166/304
 See application file for complete search history.

(56) References Cited

U.S. PATENT DOCUMENTS

| | | | |
|---|---|---|---|
| 7,134,496 B2 * | 11/2006 | Jones | C09K 8/36 166/278 |
| 8,598,090 B2 * | 12/2013 | Svoboda | C09K 8/32 507/263 |
| 2014/0121135 A1 * | 5/2014 | Gamage | C09K 8/36 507/131 |
| 2017/0088763 A1 * | 3/2017 | Sui | C09K 8/604 |

* cited by examiner

*Primary Examiner* — William D Hutton, Jr.
*Assistant Examiner* — Ashish K Varma
(74) *Attorney, Agent, or Firm* — Bell Nunnally & Martin LLP (57) ABSTRACT

Various embodiments provide methods and systems for providing fluid lighteners for use in downhole wells. The fluid lighteners may include one or more viscosifiers, one or more aphron generators, and a location-specific non-emulsifying surfactant.

20 Claims, 3 Drawing Sheets

SYSTEMS AND METHODS FOR PROVIDING FLUID LIGHTENERS WHILE REDUCING DOWNHOLE EMULSIFICATIONS

CROSS-REFERENCE TO RELATED APPLICATIONS

This patent application is a continuation of U.S. patent application Ser. No. 17/230,559, filed Apr. 14, 2021, which is a continuation-in-part of U.S. patent application Ser. No. 17/127,814, filed Dec. 18, 2020, which claims priority to U.S. Provisional Patent Application Ser. Nos. 62/923,186, filed Oct. 18, 2019, all of which are hereby incorporated herein by reference.

BACKGROUND

Technical Field

This invention relates generally to systems and methods for providing fluid lighteners and, more particularly, to systems and methods for using aphrons in drilling, servicing, drillouts, cleanouts, and other operations related to oil and gas wells.

Background

An oil well is a general term for any boring through the earth's surface that is designed to find and acquire petroleum oil hydrocarbons. Usually some natural gas is produced along with the oil. The basic elements of the production system include the: reservoir, wellbore, tubulars, drill strings and associated equipment, wellhead, flowlines and processing equipment, and artificial lift equipment. The reservoir is the source of fluids for the production system. It is often the porous, permeable media in which the reservoir fluids are stored and through which the fluids will flow to the wellbore.

Abbreviations used herein are as follows: cp=centipoise; g=grams; bbl=42 gallon barrel; ppg=pounds per gallon; ppb=pounds per barrel; psi=pounds per square inch; rpm=revolutions per minute; STI=shear thinning index which is the ratio of the 0.5 rpm Brookfield viscosity and the 100 rpm Brookfield viscosity, a measure of the degree of shear thinning of a fluid; vol.=volume.

Wells are often created by drilling a hole, e.g., 5 to 50 inches in diameter, into the earth with a drilling rig that rotates a drill string with a bit attached. After each interval is drilled, sections of steel pipe (casing), slightly smaller in diameter than the borehole, are normally placed in the hole. Cement may be placed between the outside of the casing and the borehole. The casing provides structural integrity to the newly drilled wellbore, in addition to isolating high pressure zones from each other and from the surface. Drilling fluid, a.k.a. mud, is pumped down the inside of the drill pipe and exits at the drill bit. Drilling mud is a complex mixture of fluids, solids, and chemicals that must be carefully tailored to provide the correct physical and chemical characteristics required to safely drill the well. Particular functions of the drilling mud include cooling the bit, preventing destabilization of the rock in the wellbore walls, overcoming the pressure of fluids inside the rock so that these fluids do not enter the wellbore, and/or lifting rock cuttings to the surface. To remove drilled cuttings from the wellbore, the fluid flows upward in the annulus faster than the rate at which the cuttings would otherwise fall. The flow rate or annular velocity is limited by the output of the pump as well as pressure and formation considerations. However, the rate at which cuttings fall in a fluid can be reduced by increasing the viscosity and thixotropy of the fluid. The generated rock cuttings are then swept up by the drilling fluid as it circulates back to surface outside the drill pipe. The fluid then goes through shakers that strain the cuttings from the fluid, which may then be recirculated. The pipe or drill string to which the bit is attached is gradually lengthened as the well gets deeper by screwing in additional, e.g., 30-foot (9 m), sections or joints of pipe under the kelly or topdrive at the surface. Once the well has been drilled, it is completed to provide an interface with the reservoir rock and a tubular conduit for the well fluids.

A wellhead is a general term used to describe the component at the surface of an oil or gas well that provides the structural and pressure-containing interface for the drilling and production equipment. The tubing serves as the primary conduit for fluid flow from the reservoir to the surface, although fluids also may be transported through the tubing-casing annulus. As the fluid flows from the reservoir into and through the production system, it experiences a continuous pressure drop. The pressure begins at the average reservoir pressure and ends either at the pressure of the transfer line or near atmospheric pressure in the stock tank. In either case, a large pressure drop is experienced as the reservoir fluids are produced to the surface. The pressure reduction depends on the production rate and, at the same time, the production rate depends on the pressure change.

After drilling and casing the well, it must be completed. Completion is the process in which the well is enabled to produce oil or gas. In a cased-hole completion, small holes called perforations may be made in the portion of the casing which passes through the production zone, to provide a path for the oil to flow from the surrounding rock into the production tubing. After a flow path is made, acids and fracturing fluids may be pumped into the well to fracture, clean, or otherwise prepare and stimulate the reservoir rock to produce hydrocarbons into the wellbore. Finally, the area above the reservoir section of the well is packed off inside the casing, and connected to the surface via tubing. In many wells, the natural pressure of the subsurface reservoir may be high enough for the oil or gas to flow to the surface. However, this is not always the case, especially in depleted fields where the pressures have been lowered by other producing wells, or in low permeability oil reservoirs. In such cases, artificial lift methods may also be needed. Common solutions include downhole pumps, gas lift, or surface pump jacks. Many new systems have been introduced for well completion. These new systems allow casings to run into the lateral zone with proper packer/frac port placement for optimal hydrocarbon recovery.

The production stage is the most important stage of a well's life, when the oil and gas are produced. By this time, the rigs used to drill and complete the well have moved off the wellbore, and the top is usually outfitted with a collection of valves called a Christmas tree. These valves regulate pressures, control flows, and allow access to the wellbore in case further work is needed. From the outlet valve of the Christmas tree, the flow can be connected to a distribution network of pipelines and tanks to supply the product to refineries, natural gas compressor stations, or oil export terminals. As long as the pressure in the reservoir remains high enough, the Christmas tree is all that is required to produce the well.

If the pressure depletes and it is considered economically viable, an artificial lift method may be used. Workovers are often necessary in older wells, which may need smaller diameter tubing, scale or paraffin removal, acid matrix jobs, or completing new zones of interest in a reservoir. Such remedial work can be performed using workover rigs, for example, to pull and replace tubing and/or provide other well intervention techniques. Enhanced recovery methods such as water flooding, steam flooding, or $CO_2$ flooding may be used to increase reservoir pressure and provide a sweep effect to push hydrocarbons out of the reservoir. Such methods may require the use of injection wells and may be used when facing problems with reservoir pressure depletion, high oil viscosity, or sometimes early in a field's life.

When the well is completed, openings must be made in the casing and cement to allow oil and gas to flow into the well. A perforation tool with explosive charges may be used. Next, the frac job begins. Hydraulic fracturing is a well stimulation technology used to maximize the extraction of underground resources; including oil, natural gas, geothermal energy, and even water, by fracturing the formation to create enhanced pathways for the fluids to flow into gathering wells. Hydraulic fracturing is a stimulation technique that has become widely used by the oil and gas industry to enhance and sometimes enable shale oil and gas production. The maturation of this technology is the key driver behind the shale boom in the United States and around the world. In a hydraulic fracturing treatment, fluid is injected into the well at rates higher than the reservoir matrix will accept. Rapid injection produces a buildup in wellbore pressure until a pressure large enough to overcome rock stresses is reached. At this pressure, failure occurs allowing a crack or fracture to be formed. Continued fluid injection with selected proppant results in a high conductivity crack in the formation and thereby well stimulation. Hydraulic fracturing is a highly engineered process. Proper design of a frac job considers petrophysical rock properties, the fluid chemical and physical properties, and the characteristics of the proppant (e.g., sand and/or beads) used. Frac jobs are closely monitored for volume, pressure, flow rate, temperature, and other parameters. Careful construction of a well is an important precursor to fracking the well. Oftentimes, surface casing is inserted, and the casing is cemented in place to ensure good bonding between the casing and the walls of the drilled hole. Additional drilling, including the vertical and/or horizontal leg of the well, may be followed by cementing other layers of casing into place.

The level of permeability in a rock holding oil and gas dictates whether the reservoir may need to be hydraulically fractured. At lower permeabilities, such as shale, most wells will not flow economic quantities of fluids without extensive hydraulic fracturing. On a well with a long horizontal section in the hydrocarbon-bearing formation, the well may not be perforated and fracked all at once. Rather, it may be done in a series of stages, each being several hundred feet in length. The outermost stage may be segregated from the rest of the well with a plug. A perforating tool creates the openings in that section of pipe, and then the frac job is performed on that stage. When that stage of the frac job is finished, another plug may be set several hundred feet further back to create a second stage, and the perforation and fracking are repeated. This process continues until the entire length of the well in the formation has been completed. Oftentimes, the frac plugs must then be milled out. The mill out of frac plugs and frac sleeves often use coiled tubing (CT) and/or pulling units. These operations are often expensive and may require several days to complete. In the past, traditional milling procedures included numerous short trips, sometimes referred to as wiper trips. By optimizing fluids system technology, operators may be able to reduce costs and produce cleaner wellbores.

By way of example, a well may be drilled to a vertical depth of 8000 feet with a horizontal lateral length of 5500 feet. Typical completions often consist of multiple stages using the plug and perforate method. Locations are often multi-well pads that have, e.g., 4 to 6 wells per pad spaced 15 feet apart. In a typical wellbore, after fracking a well, CT, pulling units, or other systems may be utilized to drill out the plugs and clean the wellbore. Drillout operations often encounter large amounts of sand and debris which needs to be cleared from the wellbore. New wells often include lateral lengths of 7500 feet or more with many additional stages to the completion with more plugs to drill out. Thus, hole cleaning is often a major concern in horizontal well drillouts and cleanouts.

Crude oil is seldom produced alone because it generally is commingled with water. The water may create problems and usually increases the cost of oil production. An emulsion consists of a dispersion (droplets) of one liquid in another immiscible liquid. The phase that is present in the form of droplets is the dispersed or internal phase, and the phase in which the droplets are suspended is called the continuous or external phase. For produced oilfield emulsions, one of the liquids is aqueous and the other is crude oil. The amount of water that emulsifies with crude oil varies widely. It can range from, e.g., less than 1% to greater than 80%. Emulsions can be difficult to treat, difficult to separate, and may cause several operational problems, such as, for example, pressure drops in flow lines. Crude oil emulsions form when oil and water come into contact with each other, when there is sufficient mixing, and/or when an emulsifying agent is present. During crude oil production, there are several sources of mixing, often referred to as the amount of shear. The amount of mixing depends on several factors and is often difficult to avoid. Emulsions can form when fluid filtrates or injected fluids and reservoir fluids mix, or when the pH of the producing fluid changes, such as after an acidizing treatment. Most emulsions break easily when the source of the mixing energy is removed. However, some natural and artificial stabilizing agents, such as surfactants and small particle solids, may keep fluids emulsified. Natural surfactants, created by bacteria or during the oil generation process, can be found in many waters and crude oils, while artificial surfactants are part of many drilling, completion, or stimulation fluids. Among the most common solids that stabilize emulsions are iron sulfide, paraffin, sand, silt, clay, asphalt, scale, and/or corrosion products.

Formation damage during the drilling process due to invasion by fluids is another known problem. Many zones contain formation clays which hydrate when in contact with water such as the filtrate from fluids. These hydrated clays tend to block the producing zones so that oil and gas cannot move to the borehole and be produced. To avoid this, Low Shear Rate Viscosity (LSRV) fluids may be used. LSRV may be created by the addition of specialized chemicals to water or brines to form a drilling mud. These chemicals have a unique ability to create extremely high viscosity at very low shear rates. Viscosity describes a substance's resistance to flow. High-viscosity mud is typically described as "thick," while low-viscosity mud is characterized as "thin." LSRV fluids have been widely used in drilling operations because of their carrying capacity and solids suspension ability. They have been accepted as a way to minimize cuttings bed formation in high angle and horizontal wells. Examples include the aphron-containing well drilling fluids described in U.S. Pat. Nos. 6,422,326 and 6,716,797, both to Brookey, and both of which are hereby incorporated by reference.

In the oilfield, it is often beneficial to know the drilling fluid's viscosity and other rheological properties. Rheology is the science of the resistance of fluid to flow and looks at, for example, characteristics such as gel strength, funnel viscosity, plastic viscosity, and yield point. Rheological models are important because they are used to simulate the characteristics of the mud under dynamic conditions, such as equivalent circulating density, pressure drops in the system, and hole cleaning efficiency. The gel strength is the shear stress of drilling mud that is measured at a low shear rate after the drilling mud has been static for a certain period of time. The gel strength is an important drilling fluid property because it demonstrates the ability of the drilling mud to suspend solids and weighting material when circulation is ceased.

The funnel viscosity is the time (in seconds) for mud to flow through a Marsh funnel. The Marsh funnel is dimensioned so that the outflow of time of one quart of freshwater (946 cc) at a temperature of 70° F.±5° F. (21° C.±3° C.) in 26±0.5 seconds. For all drilling mud, especially oil based mud, temperate has an effect on the viscosity of a base fluid. The base fluid will often thin as the temperature increases, thus, the funnel viscosity will decrease. This is the reason why the viscosity measured from the Marsh funnel at the surface may not represent the true drilling mud viscosity downhole. On the drilling rig, this measurement of the mud viscosity is still useful because it is a quick and simple test for observing trends of drilling mud. In order to use the funnel viscosity effectively, the values are often recorded frequently so that trends in the funnel viscosity can be identified.

Plastic viscosity (in Centipoise) is the slope of shear stress and shear rate. Typically, a viscometer is utilized to measure shear rates at 600, 300, 200, 100, 6, and 3 revolutions per minute (rpm). In the field, the plastic viscosity can be determined using relatively simple calculations. An increase in solid content in drilling mud such as barite, drill solids, lost circulation material, etc., may result in higher plastic viscosity. In order to lower the plastic viscosity, solid content may be removed using filters and/or diluting drilling mud with a base fluid. Downhole temperatures often increase at increased depths, therefore the plastic viscosity of the drilling mud will decrease as the base fluid thins. Normally, the higher the mud weight, the higher the plastic viscosity will be. Moreover, if oil based mud is used, water in oil based drilling fluid will often act like a solid and it may increase the plastic viscosity dramatically. While thicker mud may cause a reduction in rate of penetration, an increase in solid content may increase the risk of differential sticking, especially in water based mud, due to an increased plastic viscosity.

Field experience indicates that LSRV is helpful in controlling the invasion of drilling fluids and filtrate by creating a high resistance to movement into the formation openings. Since the fluid moves at a slow rate, viscosity maintains rheology characteristics and the drilling fluid remains in the borehole with reduced penetration. This has been beneficial in protecting the zones from damage and reducing differential sticking in these fluids. Horizontal drilling, in particular, has increased the need to drill across zones that are not only low pressure, but highly fractured and/or permeable. The exposure of numerous fractures or openings having low formation pressures has increased the problem of lost circulation and formation invasion. This has led to the use of underbalanced drilling techniques to control the losses and invasion of these zones. Some of these techniques include the use of air, mist, and foam drilling fluids. Foaming occurs due to high interfacial surface tension phenomena or mechanical air entrapment. While a small amount of foaming occurs in most drilling muds and normally does not adversely affect the mud, there is a risk of serious mechanical damage to the pumps. For example, a pump may become locked if a large bubble of air passes into it or is formed within it by cavitation or any other phenomenon such as simple coalescence.

Before a well can be fractured, frac plugs are installed in the wellbore so that perforating operations can be carried out. Plug-and-perf is an inherently slow method for completing wells, by virtue of tripping in and out of the well with tools for every stage, then pumping the stimulation treatment. In vertical wells and later in single stage count horizontal wells, this operational time was not significant. Debris from mill cuttings was also less of an issue, because the plug debris just fell to the bottom of the well and did not inhibit current or future operations. However, as extended-reach laterals have become more commonplace and stage counts reach into the hundreds, a typical run-in rate of 200 to 300 ft/min can make for an onerous and expensive completion operation. When multi-stage hydraulic fracturing shifted from vertical wells to horizontal wells, and as horizontal wells became longer with tighter stage spacing to access more reservoir, stimulation operations became more time-consuming and complex.

Fracturing fluids generally include a viscosifying or gelling agent (such as a polysaccharide material or a viscoelastic surfactant) to increase the viscosity of the fluid and to enhance formation of a proppant bed into the fracture. It can be carried out by generating a foam on the surface and then injecting the foam under pressure into the formation. The foam can be generated on the surface by combining, for example, nitrogen gas or carbon dioxide with an aqueous fluid. Foam fracturing can also be carried out by generating a foam in the formation. Once the desired fracturing is achieved, pressure is released at the well head causing the foam to expand and exit the well. One method of fracturing with fluids containing aphrons is described in U.S. Pub. Pat. No. 2013/0126163, to Gupta, et al., which is hereby incorporated by reference.

While aphrons in LSRV fluids have been used in drilling, they have not been widely used in completion operations due to a variety of problems, including, for example, hole cleaning, control of formation fluids, corrosion, emulsions, and requirements for expensive, often hard to get equipment such as compressors and boosters. Thus, a method is needed to facilitate the use of aphrons in LSRV fluids for drillout and cleanout operations that avoids these problems.

SUMMARY OF THE INVENTION

Embodiments of the invention include methods and compositions for the lightening of fluid for use in oil and gas operations and, in particular, drillout and cleanout operations in vertical and horizontal wellbores. In some embodiments, the fluid lightening may be utilized after well completion processes, such as, for example, hydraulic fracturing, have been completed. In one embodiment, a fluid is provided that contains a base fluid, a viscosifying agent, aphrons, and a location specific non-emulsifying surfactant along with other optional specialty additives to allow the optimization and management of physical properties of rheology up to LSRV. In another embodiment, a production fluid from a well site is tested and a plurality of different fluids are added to a base fluid at the well site, including the addition of a viscosifying agent, aphron generator, and a location specific non-emulsifying surfactant, the type and volume of location specific non-emulsifying surfactant being determined based at least in part on the testing. In another embodiment, the fluid combination may be reused at multiple wellbores and/or well sites.

In some embodiments, a new fluid mixture is provided that combines the use of LSRV-generating polymers with surfactants to form colloidal gas aphrons at a concentration of between, e.g., 1 and 20 gallons per 100 barrels in a re-circulateable servicing fluid for use in, e.g., drillout and cleanout operations. The aphron generator forms microbubbles using encapsulated air available from, e.g., atmospheric pressure intentionally introduced to the circulating system. The low shear rate polymers help strengthen the microbubbles and provide a resistance to movement within the formation so that losses of fluid are reduced. In some embodiments, the fluid may include a location specific non-emulsifying surfactant to reduce downhole emulsifications.

In one embodiment, a process for using a re-circulateable servicing fluid is provided having an enhanced LSRV containing aphrons and a location specific non-emulsifying surfactant. The process can comprise, consist essentially of, or consist of the stated steps with the stated materials. The compositions can comprise, consist essentially of, or consist of the stated materials.

The above summary of the invention is not intended to represent each embodiment or every aspect of the present invention. Particular embodiments may include one, some, or none of the listed advantages.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

The present invention is directed towards systems and methods for providing fluid lighteners and, more particularly, to systems and methods for providing fluid lighteners for downhole operations.

In some embodiments, the fluid lighteners may be utilized where reservoir stimulation processes, including, for example, hydraulic fracturing, have been completed and where a servicing fluid will be introduced inside a cased hole where the removal of frac plugs, sand, and/or bi-products of prior drilling and completion servicing operations may be necessary to enhance the ultimate production of oil and gas. In some embodiments, the servicing fluid may reduce the occurrence and/or severity of downhole emulsifications in the reservoir and/or reservoir damage from losses of the circulating servicing fluid to the reservoir. In some embodiments, the servicing fluid may maintain a fluid weight that does not overcome the maximum allowable downhole pressure gradient. In some embodiments, a well drillout and cleanout fluid is provided comprising a base liquid, a first type of a surfactant, a second type of surfactant, a solvent, and other additives. In some embodiments, the drillout and cleanout fluid may comprise an aqueous liquid having a water-soluble polymer hydrated therein and a surfactant. In some embodiments, the base liquid may be fresh water, saturated brine, cut brine, re-processed produced water, Potassium Chloride (KCl), Calcium Chloride (CaCl), and/or produced water.

The term surfactant, as used herein, refers to compounds having an amphiphilic structure which gives them a specific affinity for oil/water-type and water/oil-type interfaces which helps the compounds to reduce the free energy of these interfaces and to stabilize the dispersed phase of a microemulsion. The term surfactant encompasses cationic surfactants, anionic surfactants, amphoteric surfactants, nonionic surfactants, zwitterionic surfactants, and mixtures thereof. In some embodiments, the surfactant is a nonionic surfactant, which generally do not contain any charges. Amphoteric surfactants generally have both positive and negative charges, however, the net charge of the surfactant can be positive, negative, or neutral, depending on the pH of the solution. Anionic surfactants generally possess a net negative charge. Cationic surfactants generally possess a net positive charge. The term surface energy, as used herein, refers to the extent of disruption of intermolecular bonds that occur when the surface is created (e.g., the energy excess associated with the surface as compared to the bulk). Generally, surface energy is also referred to as surface tension (e.g., for liquid-gas interfaces) or interfacial tension (e.g., for liquid-liquid interfaces). Surfactants generally orient themselves across the interface to minimize the extent of disruption of intermolecular bonds (i.e., lower the surface energy). Typically, a surfactant at an interface between polar and non-polar phases orient themselves at the interface such that the difference in polarity is minimized.

In some embodiments, the first and/or second surfactant may be a blend of anionic and non-ionic surfactants and co-surfactants in an aqueous solution that provide low-shear-rate viscosity (LSRV) and encapsulate air in the fluid creating micro-bubbles. In some embodiments, the first surfactant may be a viscosifier, such as, for example, Xanthan gum, commonly referred to as XC. Depending on the chemical properties of the base fluid and/or the wellbore fluid, the viscosifier may be a dried XC or may be a liquid XC. For example, in embodiments needing less and/or slower hydration, a dried XC may be utilized. In some embodiments, the XC may be a dried material suspended in oil. In some embodiments, the second surfactant may be an aphron generator comprising ethylene glycol monobutyl ether (EGMBE) (e.g., 15-20%); methanol (e.g., 10-30%); and isopropyl alcohol (e.g., 5-10%) may be added to generate aphrons with conventional mixing and surface equipment rigs. Once the base fluid has been built to a minimum LSRV of, for example, 50,000 cPs, the aphron generator may be added through the mud hopper. The air, shear, and pressure drop associated with mixing through the hopper may be used to create a 10-15% volume of aphrons in the base fluid. The concentration of aphron-generating surfactant required is generally less than the critical micelle concentration (CMC) of the surfactant or surfactant mixture. An indication of the volume of aphrons generated can be obtained by determining the density reduction which occurs upon generating the aphrons in the fluid. Foaming of the fluid, which is undesirable, can occur if the concentration of aphron-generating surfactant is excessive. Typically, the concentration of surfactant can be increased as the LSRV increases. Thus, the concentration of aphron-generating surfactant is the amount required to generate sufficient aphrons to give the density reduction desired but insufficient to create a long-lasting foam on the surface of the fluid.

In some embodiments, a de-emulsifying surfactant may be used in conjunction with the aphron generator on clean outs to help eliminate emulsion between the water and oil and between the aphron-containing fluid and the oil. In some embodiments, one or more de-emulsifying surfactants may be added to a sample of production fluid and tested at temperatures approximating downhole temperatures to determine which de-emulsifying surfactant(s) should be added to the base fluid. In some embodiments, the de-emulsifying surfactant may include a solvent, a co-solvent, or a mutual solvent, which, when combined with other additives, may enhances the shell structure of micro-bubbles to reduce permeability of the shell. In some embodiments, the solvent may be selected from the group comprising: short chain alcohols, methanol, ethanol, isopropyl alcohol, ethylene glycol, propylene glycol, dipropylene glycol monomethyl ether, triethylene glycol, ethylene glycol monobutyl ether (EGMBE), tetrahydrofuran, dioxane, dimethylformamide, and dimethylsulfoxide.

In some embodiments, the de-emulsifying surfactant may include diethanolamine, which may include compounds such as Cocamide, which is derived in part from coconut oil. Cocamide is the structural basis of many surfactants. Common are ethanolamines (cocamide MEA, cocamide DEA), betaine compounds (cocamidopropyl betaine), and hydroxysultaines (cocamidopropyl hydroxysultaine). Cocamide DEA, or cocamide diethanolamine, is a diethanolamide made by reacting the mixture of fatty acids from coconut oils with diethanolamine. It is a viscous liquid and is used as a foaming agent in products like shampoos and hand soaps, and in other products as an emulsifying agent. Cocamide is a mixture of amides manufactured from the fatty acids obtained from coconut oil.

The alcohol, or combination of alcohols, may serve as a coupling agent between the solvent and the surfactant and aid in the stabilization of the aphron-containing fluid. In some embodiments, the alcohol is selected from primary, secondary, and tertiary alcohols having between 1 and 20 carbon atoms. Non-limiting examples of alcohols include methanol, ethanol, isopropanol, n-propanol, n-butanol, i-butanol, sec-butanol, iso-butanol, and t-butanol. In some embodiments, the alcohol is ethanol or isopropanol. In some embodiments, the alcohol is isopropanol. In some embodiments, the de-emulsifying surfactant may include an alcohol blend of methanol and iso-propyl alcohol which have low grade surfactant properties, but also act as solvents in many fluid additives. In some embodiments, it may include a linear alcohol ethoxylate surfactant. Alcohol ethoxylates (AE) and alcohol ethoxysulfates (AES) are surfactants found in products such as laundry detergents, surface cleaners, cosmetics, agricultural products, textiles, and paint. Alcohol ethoxylate based surfactants are non-ionic. Examples synthesized on an industrial scale include octyl phenol ethoxylate, polysorbate 80 and poloxamers. Ethoxylation is commonly used to increase water solubility. They often feature both lipophilic tails and relatively polar headgroups. AES generally are linear alcohols, which could be mixtures of entirely linear alkyl chains or of both linear and mono-branched alkyl chains. An example of these is sodium laureth sulfate a foaming agent in shampoos and liquid soaps, as well as industrial detergents.

Figure 1:
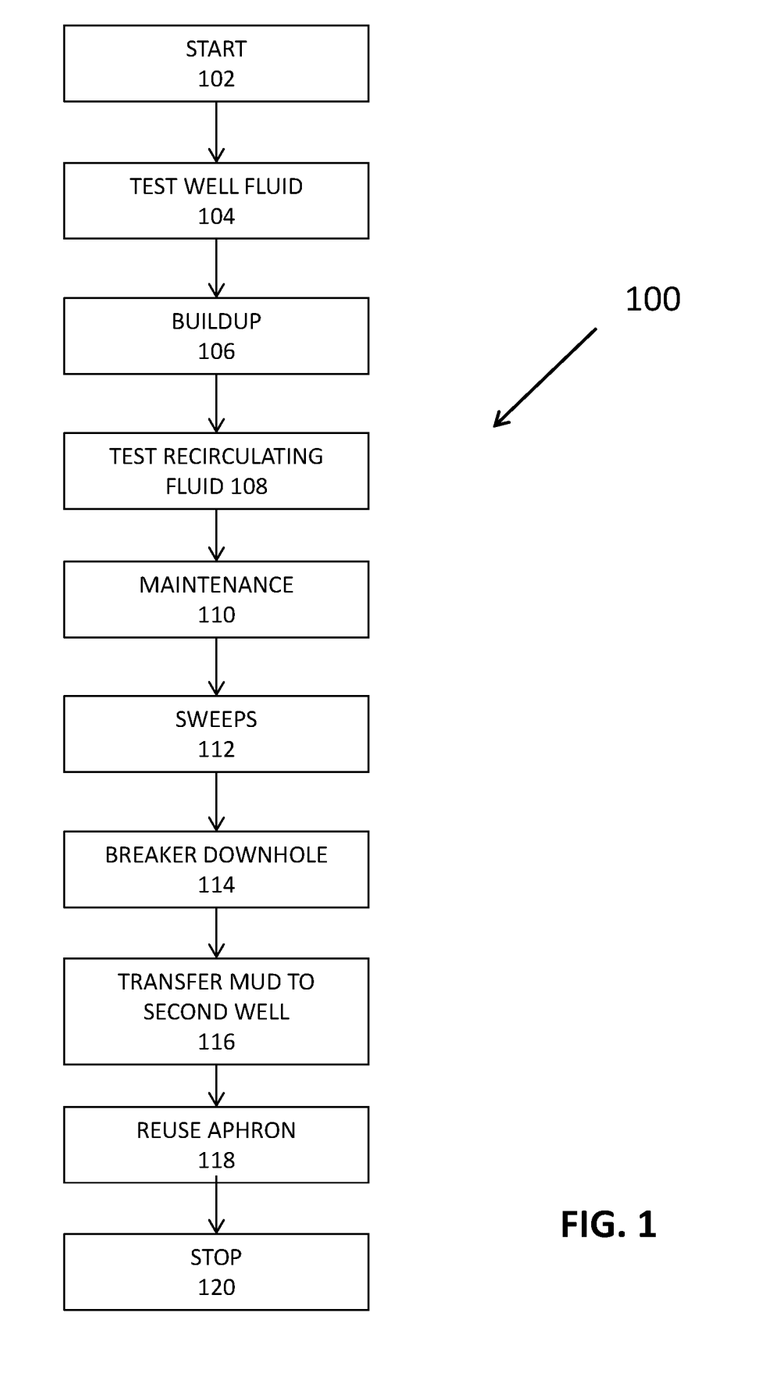
FIG. 1 is a flowchart of a method according to an exemplary embodiment.

In accordance with the embodiment shown in FIG. 1, the method (100) of using a fluid lightener may begin at step 102 and proceed to a testing phase (104), an initial build phase (106), a maintenance phase (110), and a sweeps phase (112). During the testing phase (104), samples of fluids produced from the stimulated wellbore are analyzed to determine, among other things, water type and surfactant requirements to reduce downhole emulsifications during the application of the servicing fluid. In embodiments where the servicing fluid is needed prior to production, for example in an initial drillout phase, samples of fluids may be taken from nearby wellbores having the same or similar characteristics, for example from the same formation.

Referring now to FIGS. 3A-3D, samples of fluids at various points in an embodiment of a method for testing and analyzing fluid samples are shown. In various embodiments, the testing process begins by obtaining samples of produced oil from the well head (or a nearby well head), produced water from the well head (or a nearby well head), and preparing a fluid lightener with and/or without a non-emulsifying surfactant. In the embodiment shown in FIG. 3A, the samples may be used to prepare four mixtures using various combinations of the samples. For example, Mix 1 (1A) may be formed from a mixture of the produced water (or fresh/brine water, if produced water is unavailable) and the fluid lightener, such as, for example, an aphron-containing fluid lightener, with and/or without a non-emulsifying surfactant. In various embodiments, equal parts of the produced water and fluid lightener may be mixed together, such as, for example, 50 mL of water and 50 mL of fluid lightener with non-emulsifying surfactant. Mix 2 (2A) may be the same as Mix 1 with the addition of produced oil. In the embodiment shown, equal parts of each component have been added to Mix 2 (e.g., 50 mL of water, 50 mL of fluid lightener with non-emulsifying surfactant, and 50 mL of oil). In some embodiments, Mix 2 may be formed by combing the produced oil and the produced water with the fluid lightener without the non-emulsifying surfactant. Mix 3 (3A) may be formed by combining the fluid lightener with non-emulsifying surfactant with the sample of produced oil. In some embodiments, Mix 3 may be formed by combing the produced oil and the fluid lightener without the non-emulsifying surfactant. In the embodiment shown, equal parts of each have been added to Mix 3 (e.g., 50 mL of oil and 50 mL of fluid lightener). Mix 4 (4A) is formed by combining the produced oil with the produced water. In the embodiment shown, equal parts of oil and water have been added (e.g., 50 mL of oil and 50 mL of water). In some tests, more or less of each component may be added, the ratios of each component may be varied, the volumes of each component may be varied, some components may be left out and/or other components may be added. For example, in some embodiments, a first non-emulsifying surfactant may be added to the fluid lightener used in one or more tests and/or one or more mixtures, a second non-emulsifying surfactant may be added to the fluid lightener used in one or more tests and/or one or more mixtures, or the fluid lightener used in one or more tests and/or one or more mixtures may not include a non-emulsifying surfactant.

Figure 3A:
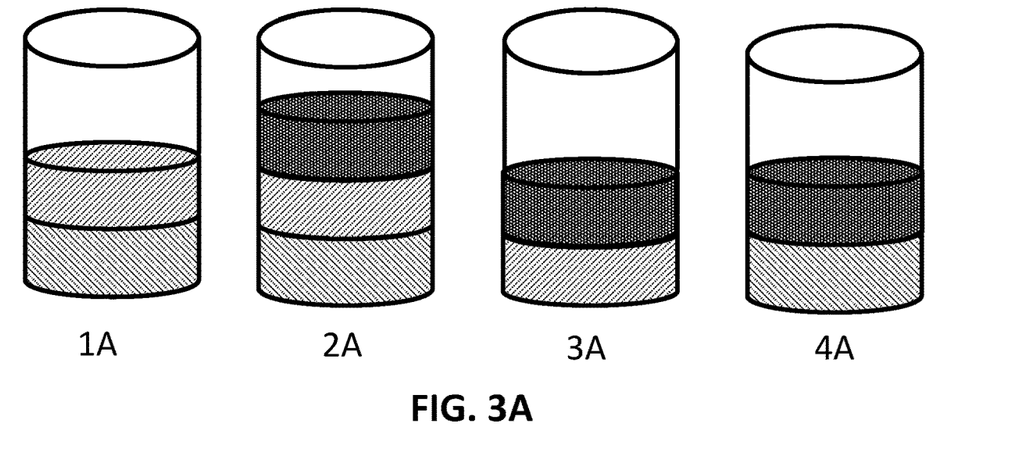
FIGS. 3A-3C are examples of testing downhole fluids.
Figure 3B:
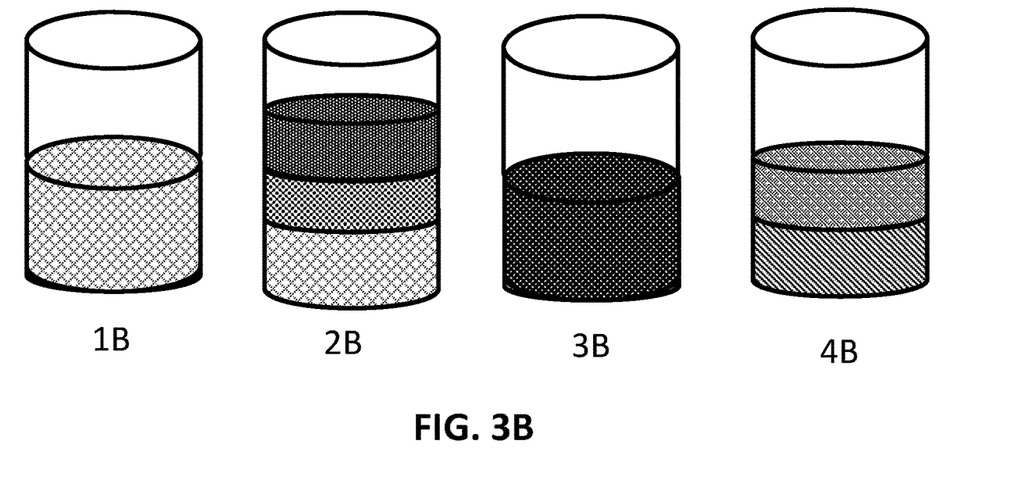

Next, the mixtures may be vigorously agitated. As part of the testing, in some embodiments, the mixtures may be tested at or near the downhole temperature in order to obtain results approximating downhole conditions. In some embodiments, the mixtures may be observed immediately after agitation and/or heating or may be placed in a roller oven and heated (e.g., 160° F.) and rolled to simulate downhole conditions, and observed at various time intervals (e.g., immediately and again at 1 hr, 4 hrs, 12 hrs, 24 hrs, etc.) for emulsion breaking in the mixtures. After agitations, all four mixtures may contain emulsions and/or be in suspension. As can be seen in FIG. 3B, after a first time interval, for example, of heating and rolling, Mix 1 (1B) and Mix 3 (3B) remain thoroughly mixed, while Mix 2 (2B) and Mix 4 (4B) have begun to separate. In particular, in Mix 2, the emulsion has separated into three layers, with the oil layer on top, the water+fluid lightener layer on bottom, and an emulsion in a middle layer. In Mix 4, the emulsion has begun to separate into an oil layer on top and a water layer on bottom, but some oil remains in the bottom layer and some water remains in the top layer.

Figure 3C:
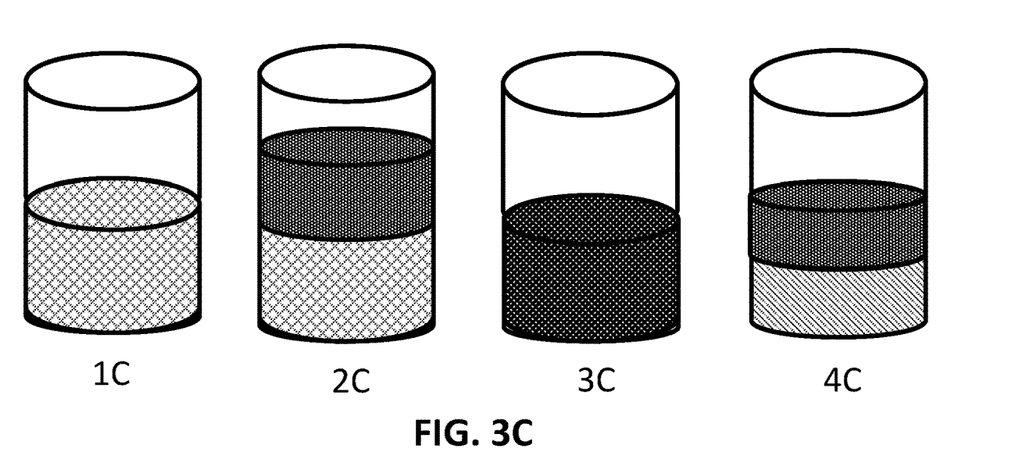

As can be seen in FIG. 3C, after additional time has passed, Mix 1 (1C) and Mix 3 (3C) remain thoroughly mixed, while Mix 2 (2C) and Mix 4 (4C) have almost completely separated. In particular, in Mix 2, the emulsion has separated into an oil layer on top and a water+fluid lightener and non-emulsifying surfactant layer on bottom. In Mix 4, the emulsion has separated into an oil layer on top and a water layer on bottom. Although FIGS. 3A-3C show exemplary test results, many different results at different times and in different orders may be observed depending on the characteristics of the oil, water, fluid lightener, and/or non-emulsifying surfactant used. For example, in some embodiments, the emulsion of Mix 3 may separate out before, at the same time, or after the emulsions of Mix 2 and/or Mix 4 break. In some embodiments, Mix 4 (oil+water) may be utilized as a reference sample. Although not shown in the figures, in some embodiments, sand and other sediment and debris may settle out from the samples during the testing process. Based on the observations made during the testing phase, a combination of chemicals and/or surfactants can be optimized for the wellbore where the samples were taken (or a nearby wellbore). For example, if the emulsions break quickly (for example, of Mixes 2 and/or 3 as compared to the reference sample (Mix 4)), a non-emulsifying surfactant may not be needed or less of the non-emulsifying surfactant may be needed. As another example, if the emulsions break slowly (for example, as compared to the reference sample), a non-emulsifying surfactant may be needed, more of the non-emulsifying surfactant may be needed, or a different non-emulsifying surfactant may be needed. As another example, if a first non-emulsifying surfactant causes the emulsions to break faster than a second non-emulsifying surfactant, it may be desirable to use the first non-emulsifying surfactant. The testing may include inspecting for the presence of emulsions and determining the chemical and rheological properties of the fluid. In various embodiments, the properties tested may include weight (lb/gal); funnel viscosity (sec/qt); plastic velocity (cP); yield point (lb/100 ft$^2$); gel strength (10 sec/10 min) (lb/100 ft$^2$); mud gradient (psi/ft); API filtrate (mL/30 min); LCM (lb/bbl) (in/out); cake thickness (API/HTHP); solids (% by vol uncorrected); oil content (% by vol); water content (% by vol); sand content (% by volume); pH (whole mud/filtrate); alkalinity (Pm); Chlorides (mg/L); total hardness (mg/L); Iron, PPM (mg/L); low gravity solids (% by vol); low gravity solids (1b/bbl); and/or other measurements.

Figure 2:
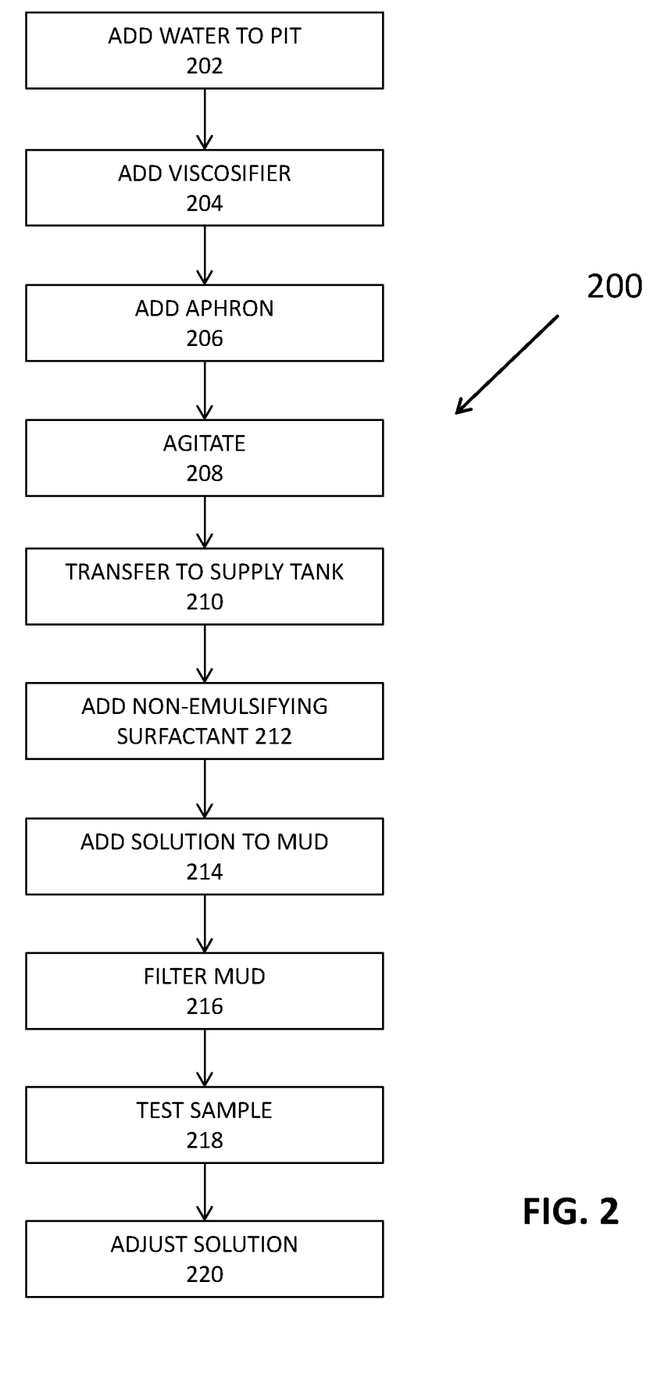
FIG. 2 is a flowchart of a method according to an exemplary embodiment.

Referring again to FIG. 1, during the initial build phase (106), one or more of the base fluid, preservatives, a pH control, polymers, surfactants, specialty chemicals, a fluid lightener, and/or lubricants may be added in a mixing process that exposes the ingredients to atmospheric pressure for the purpose of creating aphrons (i.e., an air and water emulsion). Referring now to FIG. 2, a fluid lightening method (200) is provided. At a beginning step (202), a base fluid is added to a mixing pit. In some embodiments, the base fluid may be fresh water. In a preferred embodiment, the base fluid does not include a friction reducer and may be a low chloride solution. In other embodiments, the base fluid may be brine. Next, a viscosifier is added to the base fluid (204). Next, an aphron generator is added to the mixture (206) and the mixture is agitated to stimulate the formation of microbubbles, for example, the mixture may be agitated for less than 5 minutes, between 5 and 30 minutes, or more than 30 minutes. Next, the aphron containing fluid is transferred to a supply tank (210) and a non-emulsifying surfactant is added (212) to strengthen the wall coat of the aphron bubbles. In some embodiments, the non-emulsifying surfactant may be added before the fluid is transferred to the supply tank. In various embodiments, a lower grade XC may be added to strengthen the bubble carrier. Next, the solution is added to the production mud (214) and the aphron-containing mud is circulated downhole.

Referring back to FIG. 1, once the mud is circulating downhole, the maintenance phase (110) begins. During the maintenance phase, the fluid characteristics and properties achieved as a result of the chemicals added to the base fluid during the initial build phase (106) are monitored (108) and adjusted as needed due to, for example, variability of downhole conditions. Referring again to FIG. 2, when the aphron-containing mud returns to the surface, it is filtered (216), such as with a shaker, and a sample of the filtered fluid is taken at various intervals and tested (218). Depending on the test results, additional fluid from the supply barrel may be added to the mud and/or the rate of fluid addition may be increased or decreased, or additional chemicals may be added (220).

Referring back to FIG. 1, during the sweeps phase (112), in addition to increasing, decreasing, and/or changing the amounts of chemicals previously added (e.g., during the initial build phase) and/or adding other chemicals to perform a sweep by changing the fluid profile. If, for example, production decreases, a sweep may be needed. Flow regimes are characterized by the relative amount of swirling or chaotic motion as the fluid moves along the pipe. Downhole fluid may have, in general, different flow regimes, such as laminar flow and turbulent flow. In between each zone, there is a transition zone where the flow regimes are changing. Laminar flow, which generally exists at the low shear rates encountered in the annulus, is the uniform movement of fluid elements parallel to the walls of the flow channel. A laminar regime flows smoothly with instabilities being dampened by the viscosity. Laminar flow usually occurs at a low flow velocity and it is best understood by considering mud as being layers of fluid flow. The velocity of the mud farthest away from any surface is moving the fastest and the velocity of a layer adjacent a surface moves slower. For the laminar flow, the flow has a predictable pattern, and the shear rate is a function of the shear stress of the fluid. Turbulent flow is an erratic, nonlinear flow of a fluid, caused by high velocity and low viscosity. Fluid moving in a turbulent flow region is subject to random local fluctuations in both the direction of flow and fluid velocity. During operations, it is often desirable to maintain laminar flow. The viscosity describes the measure of a fluid's resistance to flow. The flow of liquid through a pipe is resisted by viscous shear stresses within the liquid and the turbulence that occurs along the internal walls of the pipe which is created by the roughness of the pipe material. This resistance is usually known as pipe friction and is measured in feet head of the fluid, thus the term "head loss" is also used to express the resistance to flow. Simply stated, the less viscous the fluid, the greater its ease of movement through the pipe.

In the sweeps phase (112), an operator displaces the lateral with a breaker by, for example, increasing or decreasing the viscosity of at least a portion of the circulating fluid to cause a transition from laminar flow to turbulent flow. In some embodiments, fresh water (or other fluid having a low viscosity relative to the fluid in circulation) may be added to the circulating fluid to lower the viscosity and create turbulent flow to sweep or scour the downhole surfaces. In some embodiments, a breaker, such as Ammonium Persulfate, may be added to the circulating fluid to "eat" the XC to change the viscosity and create the turbulent sweep. In other embodiments, turbulent flow may be created by adding additional viscosifier to the circulating fluid. In some embodiments, the amount of modified fluid needed may be, for example, less than 10 bbl, between 10-15 bbl, or more than 15 bbl, and may vary depending on various fluid and downhole characteristics in order to cause a transition from laminar flow to turbulent flow. In some embodiments, a dye may be added to the modified fluid to provide a visual indicator when the modified fluid has returned to the surface.

Returning now to FIG. 2, in various embodiments, a base fluid is first modified with a viscosifier (204) to provide sufficient polymer loading. The viscosifier is added prior to the aphron-generating fluid lightener (206) to help maintain the integrity of the bubbles created by the fluid lightening additive in order to maintain the air and water emulsion while the servicing fluid is circulated to assist in cleaning the hole. The aphron generator creates microbubbles to lighten the fluid and the microbubbles are protected and enabled by first viscosifying the base fluid. In various embodiments, the viscosifier may provide sufficient protection of the aphron microbubbles to allow continued recirculation downhole. The aphrons are non-coalescing and recirculatable so that density reduction may be accomplished without expensive air or gas injection. In other embodiments, a surfactant may be added (212) after the aphron generator is added to the viscosified fluid in order to enhance the microbubbles and help lower friction pressure by reducing surface tension. In some embodiments, the surfactant may be a non-emulsifying surfactant to reduce the occurrence or severity of the downhole emulsion of oil and water while the servicing fluid is being circulated. The servicing fluid is then able to successfully circulate through the wellbore and clean the wellbore without overcoming the downhole pressure gradient and while simultaneously reducing downhole emulsification of oil and water. In one embodiment, the fluid lightener may include the following chemicals added to the base fluid:

| Generic | Chemical Name | Units |
|---|---|---|
| Viscosifier | Xanthan Gum | 0.25-2.5 lb/bbl |
| Surfactant | Anionic Surfactant | 0.25-20 gal/100 bbl |
| Aphron Generator | EGMBE | 1-20 gal/100 bbl |
| Preservative | Methyl Alcohol | 1-5 gal/100 bbl |
| Biocide | Gluteraldehyde | 1-15 gal/100 bbl |
| Colored Dye Marker | Colored Dye | 1-128 oz/100 bbl |
| Non-Emulsifying Surfactant | Diethanolamine | .25-20 gal/100 bbl |

In other embodiments, the concentrations and amounts may be varied according to the following chart:

| Generic | Chemical Name | Units |
|---|---|---|
| Viscosifier | Xanthan Gum | 0.3-1.5 lb/bbl |
| Surfactant | Anionic Surfactant | 1.5-2 gal/100 bbl |
| Aphron Generator | EGMBE | 4-10 gal/100 bbl |
| Preservative | Methyl Alcohol | 1-2.5 gal/100 bbl |
| Colored Dye Marker | Colored Dye | 5-7 oz/100 bbl |
| Non-Emulsifying Surfactant | Diethanolamine | 2.0-10.0 gal/100 bbl |
| Biocide | Gluteraldehyde | 1-5 gal/100 bbl |

In some embodiments, additional chemicals may be added to the base fluid depending on the needs of the well. For example, a water-based mud anti-foamer specifically formulated for use in aphron-containing water-based fluids may be necessary to treat surface foams without removing the aphrons from the system. These chemicals may include the following:

| Generic | Chemical Name | Units |
|---|---|---|
| Shale Stabilizer | Potassium Chloride | 2000-35000 ppm |
| Torque Reduction | CoPolymer Beads | 0.2-5 lb/bbl |
| Oxidizing Agent (breaker) | Ammonium Persulfate | 0.1-10 lb/1000 gal |
| Defoamer | Defoamer | 0.1-0.5% by volume |
| pH Control | CaOH— | 7-10.5 pH |
| Metal Binder | Iron Fix | 2-10 gal/100 bbl |
| Corrosion Inhibitor | Phosphate Ester | 1-10 gal/100 bbl |
| Remove Sulfites from System | Triazine | 1-10 gal/100 bbl |

In other embodiments, the concentrations and amounts may be varied according to the following chart:

| Generic | Chemical Name | Units |
|---|---|---|
| Shale Stabilizer | Potassium Chloride | 2000-35000 ppm |
| Torque Reduction | CoPolymer Beads | 0.25-2 lb/bbl |
| Oxidizing Agent | Ammonium Persulfate | 2-3 lb/1000 gal |
| Defoamer | Defoamer | 0.1-0.2% by volume |
| pH Control | CaOH— | 8-10 pH |
| Metal Binder | Iron Fix | 6-7 gal/100 bbl |
| Corrosion Inhibitor | Phosphate Ester | 3-6 gal/100 bbl |
| Remove Sulfites from System | Triazine | 1-3 gal/100 bbl |

In some embodiments, alternative chemicals may be added to the base fluid depending on the needs of the well and the availability and cost of the chemicals. These chemicals may include the following:

| Generic | Chemical Name | Units |
|---|---|---|
| Shale Stabilizer | Non-ionic Polymer | 0.1-10 gal/100 bbl |
| Torque Reduction | Lubricant w/ or w/o Beads | 0.25-5% by vol. |
| Oxidizing Agent | Sodium Hypochlorite or Peroxide | as needed |
| pH Control | NaOH | 7-10.5 pH |
| pH Control & Reduce Hardness | $Na_2CO_3$ | 7-10.5 pH |
| pH Control & Potassium Source | KOH | 7-10.5 pH |
| Corrosion Inhibitor | Filming Amine | 1-10 gal/100 bbl |

In other embodiments, the concentrations and amounts may be varied according to the following chart:

| Generic | Chemical Name | Units |
|---|---|---|
| Shale Stabilizer | Non-ionic Polymer | 0.25-5 gal/100 bbl |
| Torque Reduction | Lubricant w/ or w/o Beads | 0.25-2% by vol. |
| Oxidizing Agent | Sodium Hypochlorite or Peroxide | as needed |
| pH Control | NaOH | 8-10 pH |
| pH Control & Reduce | $Na_2CO_3$ | 8-10 pH |

-continued

| Generic | Chemical Name | Units |
| --- | --- | --- |
| Hardness pH Control & Potassium Source | KOH | 8-10 pH |
| Corrosion Inhibitor | Filming Amine | 2-4 gal/100 bbl |

In some embodiments, alternative chemicals may be added to the base fluid depending on the needs of the well and the availability and cost of the chemicals. These chemicals may include the following:

| Generic | Chemical Name | Units |
| --- | --- | --- |
| Viscosifier and Friction Reducer | PHPA | 0.1-10 gal/100 bbl |
| Stabilizer, Friction Reducer, Enhancer | Polymerized Carbohydrate | 0.25-10% by vol. |
| Shale Stabilizer | KCl Substitute (Choline Chloride) | 0.25-3 gal/1000 gal |
| Shale Stabilizer | Potassium Acetate | 2000-5000 ppm |
| Shale Stabilizer | Potassium Carbonate | 2000-5000 ppm |
| Hole Stabilizer and Viscosifier | Hole Stabilizer/ Viscosifier | 0.2-5 lb/bbl |

In other embodiments, the concentrations and amounts may be varied according to the following chart:

| Generic | Chemical Name | Units |
| --- | --- | --- |
| Viscosifier and Friction Reducer | PHPA | 0.25-10 gal/100 bbl |
| Stabilizer, Friction Reducer, Enhancer | Polymerized Carbohydrate | 0.25-3% by vol. |
| Shale Stabilizer | KCl Substitute (Choline Chloride) | 0.5-1 gal/1000 gal |
| Shale Stabilizer | Potassium Acetate | 2000-3000 ppm |
| Shale Stabilizer | Potassium Carbonate | 2000-3000 ppm |
| Hole Stabilizer and Viscosifier | Hole Stabilizer/ Viscosifier | 0.25-2 lb/bbl |

The base aqueous fluid in which the low shear rate modifying polymer is hydrated may be any aqueous liquid which is compatible with the polymer. Thus, the base liquid may be fresh water, produced water, and/or a brine containing soluble salts such as sodium chloride, potassium chloride, calcium chloride, sodium bromide, potassium bromide, calcium bromide, zinc bromide, sodium formate, potassium formate, cesium formate, and the like. The brine may contain one or more soluble salts at any desired concentration up to saturation. The fluids comprise a liquid, a viscosifier which imparts a low shear rate viscosity to the fluids of at least 10,000 centipoise, an aphron-generating surfactant, and aphrons. Stable aphron-containing fluids are obtained by increasing the low shear rate viscosity (LSRV) of the fluid to at least 10,000 centipoise, preferably at least 20,000 centipoise, and most preferably to at least 50,000 centipoise. Since the stability of the aphrons is enhanced as the LSRV increases, a LSRV of over a hundred thousand centipoise may be desired. The aphrons are obtained by incorporating (1) an aphron-generating surfactant into the fluid and thereafter generating the aphrons in the fluid or (2) generating the aphrons in a liquid compatible with the fluid and mixing the aphron-containing fluid with the fluid.

The polymer used to build the base fluid and maintain the fluid while re-circulating should preferably be able to achieve the characteristics of LSRV while also protecting the microbubbles without interfering in the reduction of downhole emulsification of water and oil. The polymers useful in the LSRV fluids may comprise any water-soluble polymer which increases the LSRV of the fluid to produce a fluid exhibiting a high yield stress, shear thinning behavior and does not interfere in the reduction of downhole emulsifications of oil and water while also protecting the microbubbles created by the addition at the appropriate time of the aphron generator and atmospheric pressure. Particularly useful are biopolymers produced by the action of bacteria, fungi, or other microorganisms on a suitable substrate. Exemplary biopolymers are the polysaccharides produced by the action of *Xanthomonas compestris* bacteria which are known as xanthan gums. See, for example, U.S. Pat. Nos. 4,299,825 and 4,758,356, each incorporated herein by reference. Other biopolymers useful in the fluids are the so-called welan gums produced by fermentation with a microorganism of the genus *Alcaligenes*, Gellan gums, schleroglucan polysaccharides produced by fungi of the genus *sclerotium*, and succinoglycan biopolymer. The viscosifying agent in some embodiments may be chosen from the group of carbohydrates such as polysaccharides, cellulosic derivatives, guar or guar derivatives, Xanthan, carrageenan, starch polymers, gums, polyacrylamides, polyacrylates, betaine-based surfactants, viscoelastic surfactants, and/or natural or synthetic clays.

The concentration of the polymer to increase the LSRV of the fluid can be determined by testing. The concentration will be an amount sufficient to impart to the fluid the desired LSRV. In various embodiments, the viscosifier may be Horizon Mud's Master Vis, Tex-Xan, and/or Liquid XC. Generally the fluids will contain a concentration from less than or about 0.25 lb/bbl to about 2.5 lb/bbl or more and preferably from about 0.3 lb/bbl to about 1.5 lb/bbl. In some embodiments, the fluid may include copolymer beads such as Mud Masters' Master Fine Beads and/or Master Coarse Beads. The beads may be on the order of 160-900 microns and have a specific gravity of approximately 1.13 to create a ball-bearing effect inside a cased hole to reduce metal-to-metal friction and break capillary forces.

The water based borehole fluids generally may contain materials well known in the art to provide various characteristics or properties to the fluid. Thus the fluids may contain one or more viscosifiers or suspending agents in addition to the polysaccharide, weighting agents, corrosion inhibitors, soluble salts, biocides, fungicides, seepage loss control additives, bridging agents, deflocculants, lubricity additives, shale control additives, and other additives as desired. In some embodiments, the viscosifier may be Mud Masters' Master Clear Seal-5 and/or Master Clear Seal-5 Plus. The viscosifier may be a pulverized powdery inhibitor/lubricant comprising a blend of polymers, starches, and clays, having a specific gravity of 0.66 to 0.75. The viscosifier may help lower API/HPHT fluid loss, decrease wall cake thickness, retard water hydration on clay, extrude into a formation, and act as a deforming sealer. In some embodiments, a fluid additive may include hydrolyzed glucose syrup, such as is described in U.S. Pat. No. 7,745,378, to Rayborn, Sr., entitled Drilling Fluid Additive Containing Corn Syrup Solids, which is hereby incorporated by reference.

The borehole fluids may contain one or more materials which function as encapsulating or fluid loss control additives to further restrict the entry of liquid from the fluid to the contacted shale. Representative materials known in the art include partially solubilized starch, gelatinized starch, starch derivatives, cellulose derivatives, humic acid salts (lignite salts), lignosulfonates, gums, synthetic water soluble polymers, and mixtures thereof.

The fluids should have a pH in the range from about 7.0 to about 10.5, preferably from 8 to about 10. The pH can be obtained as is well known in the art by the addition of acids and/or bases to the fluid, such as potassium hydroxide, potassium carbonate, sodium hydroxide, sodium carbonate, calcium hydroxide, and mixtures thereof and other bases commonly known in the industry.

Various embodiments of the present invention relate to the preparation and use of aphrons during the wellbore drillout and cleanout phases of hydrocarbon production from subterranean reservoirs. Unlike prior drillout and cleanout fluids, the aphrons described herein are stabilized microbubbles that are formed by the combination of solvent-surfactant blends with an appropriate water-based carrier fluid. In general, surfactants adjust surface tension and can be categorized as emulsifying surfactants and non-emulsifying surfactants. When used in rheology up to LSRV, the surfactants useful to create the aphron microbubbles should be compatible with the other chemicals present in the fluid. An aphron is a uniquely structured microbubble created by combining surfactants and polymers in a fluid. Unlike a conventional foam bubble, each aphron is made up of a core, which is often spherical of an internal phase, usually liquid or gas, encapsulated in a thin shell, which prevents leakage of air from the core, provides a barrier against coalescence with adjacent aphrons, and allows the aphron to survive downhole pressures. Typically, the outer surfactant layer is generally hydrophilic, making the aphrons compatible with surrounding water-based fluids.

In the case of the aphron-containing well cleanout fluids, the aphrons may be generated at the surface before being circulated downhole. One way of creating aphron microbubbles is by exposing the base fluid to air at the surface (i.e., at ambient pressure) and agitating the fluid using conventional fluid-mixing equipment to create an air-water emulsion. The surfactant in the fluid is incorporated to achieve the desired concentration of aphrons and produce the surface tension to contain the aphrons as they are formed. The aphrons when first generated contain a wide size distribution ranging from about 25 µm up to about 200 µm in diameter. To successfully complete the generation, the aphrons should be stabilized in the fluid. This may be achieved by using, for example a high yield stress, shear thinning polymer. This type of polymer may act as a viscosifier as well as a stabilizer.

In some embodiments, a well drillout fluid may comprise water, an aphron generator, and a combination of one or more other surfactants, solvents, and/or other additives (e.g., acid). With respect to the solubilizing agent, e.g. the solvent, particularly an organic solvent, non-restrictive examples are alcohols (e.g. methanol, ethanol, isopropanol, butanol, and the like), glycols (e.g. propylene glycol (MPG), dipropylene glycol (DPG), tripropylene glycol (TPG), ethylene glycol (MEG), diethylene glycol (DEG), and the like), glycol ethers (e.g. ethylene glycol monomethyl ether (EGMME)), ethylene glycol monoethyl ether (EGMEE), ethylene glycol monopropyl ether (EGMPE), ethylene glycol monobutyl ether (EGMBE), ethylene glycol monomethyl ether acetate (EGMMEA), ethylene glycol monoethyl ether acetate (EGMEEA acetate) and the like) and alkyl esters (e.g. methyl formate, ethyl formate, methyl acetate, ethyl acetate, butyl acetate, methyl propionate, ethyl propionate, ethyl butyrate, methyl benzoate, ethyl benzoate, methylethyl benzoate, and the like), and combinations thereof.

A solvent is a chemical additive that is soluble in oil and water and may be used to prevent or break up emulsions. A mutual solvent is a chemical additive that is soluble in oil, water, acids (often HCl-based), and other well treatment fluids. Mutual solvents are used to stabilize various oil-water emulsions. Mutual solvents remove organic films leaving them water-wet, thus the risk of emulsions may be reduced. A mutual solvent may be ethylene glycol monobutyl ether, generally known as EGBE or EGMBE. In some embodiments, the aphron-generating surfactant may include EGBE, Methanol, Isopropyl Alcohol, and/or other chemicals or equivalents or derivatives thereof. EGBE is an effective coalescent that improves film integrity. Although some embodiments utilize EGBE, other embodiments may use other solvents, other glycol ether solvent, or other chemicals having low surface tension, miscible with water and other organic liquids, and/or are readily biodegradable.

Aphron formation can be achieved along several routes. In one embodiment, aphrons are obtained by including a mixture of surfactants as aphron-generating agents into a solution containing a viscosifier. Suitable surfactants may be anionic, cationic, amphoteric, or nonionic in nature, or their mixtures. Preferably, the molar ratio is higher than 3 to 1. More preferably, it is higher than 5:1 and most preferably, it is higher than 10:1. Suitable surfactant mixtures may be mixtures of surfactants which are soluble in the described solutions. However, surfactant mixtures may also contain one or more (co-)surfactants which are insoluble in the described solutions.

In some embodiments, the surfactant may be Diethanolamine. Diethanolamine, often abbreviated as DEA or DEOA, is an organic viscous liquid. Diethanolamine is polyfunctional, being a secondary amine and a diol. Like other organic amines, diethanolamine acts as a weak base and is soluble in water. Amides prepared from DEA are often also hydrophilic. DEA is used as a surfactant and a corrosion inhibitor. In various embodiments, the non-emulsifying surfactants used should be compatible with the polymers and surfactants utilized, should not prevent a fluid from achieving LSRV, should yield in form and function to the specific chemistry of each wellbore as determined by the testing process before the base fluid is built, and should not interfere with cleaning of the hole during the re-circulating process.

Increases in vapor pressure due to pressure drops, temperature increases, and cavitation are common in downhole conditions. In various embodiments, the risk of cavitation may be reduced by slowing the rate of addition of the solution down. In various embodiments, a self-priming transfer pump may be utilized to avoid foam out of the pump. In addition, the solution may be pulled from a bottom of the supply tank to maintain the lowest possible head.

In some embodiments, aphrons large enough to be seen without magnification can be observed in the fluid as it flows from the borehole into the surface holding tanks ("pits") before being recirculated. In some embodiments, the fluid may be passed through a screen before being recirculated. After the fluid passes through the screen or shaker, a sample of the fluid may be taken and run through a centrifuge to remove solid particulate. The sample may then be tested for weight (lbs per gal), viscosity, sand content, and other properties. In addition, the rate of bbls in versus the bbls out may be monitored to detect fluid loss downhole. Upon being recirculated downhole, additional aphrons may be generated provided the concentration of the surfactant is sufficient. It may be desirable to add additional surfactant to the fluid either continuously or intermittently until the desired quantity of aphron microbubbles is produced. In various embodiments, the LSRV mud containing aphrons may be stored and reused at subsequent wellbores.

The quantity of aphrons in the fluid often depends on the density required. Generally, the fluid will contain less than 15% by volume of aphrons. Thus, the density of the circulating fluid can be monitored on the surface and additional surfactant added as necessary to maintain the desired density, if the density is too high, and weight material may be added if the density is too low. The quantity of aphrons in the fluid can be determined by adding a known quantity of a defoamer or other chemical to destabilize the surfactant-containing shells surrounding the aphrons. Measurement of the change in volume of the fluid will indicate the volume % of aphrons in the fluid. In some embodiments, Mud Masters' Z-Foam Out may be used as the defoamer.

If desired, the aphrons can be generated on the surface using the procedures and equipment set forth in the following U.S. patents, incorporated herein by reference: Sebba U.S. Pat. No. 3,900,420 and Michelsen U.S. Pat. No. 5,314,644. The well servicing fluid containing the aphrons can then be continuously circulated through the borehole. The so-called water-soluble polymer present in the fluid to enhance the LSRV of the fluid also helps to stabilize the aphrons, thus helping to prevent their coalescence. In some embodiments, the surfactant may be incorporated into the well servicing fluid by blending, pumping, pouring, and/or injecting. If necessary, air, Nitrogen, or other gas can be incorporated into the fluid to entrain more gas.

The fluid may be initially prepared containing 0.3-1.5 lb/bbl of Xanthan gum biopolymer and 1.5-2 gal/100 bbl of an anionic surfactant. The LSRV may be increased for hole cleaning and to create a resistance to movement into the formation, while the polymer encapsulation helps provide strength for the bubble wall surrounding the aphrons. The surfactant solution enables the aphrons to form, reducing the fluid density.

Typical method for chemical mixing is a recipe of adding gallons of chemical per barrels of fluid pumped, sometimes referred as batch treating. The fluid properties of the wellbore fluid and cleaning fluid may be analyzed, such as resistance, viscosity, annular velocity, and the rheology or Reynolds number along with the effects of each. Understanding the effects of friction reducer dosage optimization and monitoring the fluids continuously helps determine the correct amount of friction reducer needed to effectively overcome the internal friction of the fluids and reduce the circulating pressure required for pumping operations during the job. With the optimum chemical dosing, the flow rates and fluid regime may also be adjusted. A certain flow rate (feet per minute) may be required to maintain a sufficiently turbulent flow through the lateral section of the wellbore.

In horizontal wells, gravity causes debris from the drillout to build up along the lower side or bottom of the wellbore. Removing the debris from a horizontal or other non-vertical well can be difficult. Limited pump rate, eccentricity of the pipe, sharp build rates, high bottom hole temperatures, and oval-shaped wellbores can all contribute to inadequate hole cleaning. Well treatments by circulating fluids that have been specially formulated to remove such debris are often necessary to prevent buildup. In order to achieve debris transport within the range of flow conditions in various drillouts and cleanouts, a minimum level of turbulence at the fluid-debris interface may be required to initiate bedload debris transport. Turbulent flow may be needed to facilitate debris removal and provide the downhole conditions to remove the bedload and effectuate continuous hole cleaning during the drillout and/or cleanout. A subtle change in viscosity may have a direct and significant effect on the flow conditions. Improvements in drillout and/or cleanout efficiency and effectiveness may also be seen when mixing and monitoring the fluids throughout the job. In such a setup, the fluids and chemicals are pumped through the mixing plant and mixed on the fly while monitoring the chemical concentrations and fluid performance parameters.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. A method of treating servicing mud used in downhole drillout operations at a well site where the servicing mud is circulated between above-ground equipment and a cased wellbore, the method comprising:
   testing produced oil from a wellbore at a well site and produced water from the wellbore for a risk of downhole emulsions, the testing comprising:
      obtaining samples of produced oil from a wellbore and produced water from the wellbore;
      combining a first sample of the produced oil with a first sample of the produced water to form a first mixture and agitating the first mixture to create a first oil-and-water emulsion;
      combining a second sample of the produced oil with an aphron-containing aqueous fluid to form a second mixture and agitating the second mixture to create a second oil-and-water emulsion; and
      observing the first mixture until the first oil-and-water emulsion separates and the second mixture until the second oil-and-water emulsion separates;
   creating a fluid lightener to add to a servicing fluid based at least in part on the observations from the testing, the creating comprising:
      providing an aqueous base fluid at the well site;
      adding a viscosifier to the base fluid to achieve low shear rate viscosity;
      adding an aphron generator to the viscosified base fluid and agitating to generate aphrons in the viscosified base fluid; and
      if, during the testing, the first oil-and-water emulsion separated before the second oil-and-water emulsion, adding a non-emulsifying surfactant to the viscosified base fluid to reduce the risk of downhole emulsions;
   injecting the fluid lightener into the servicing fluid to reduce a fluid density of the servicing fluid for cleaning the cased wellbore.

2. The method of claim 1 wherein the viscosifier is xanthan gum.

3. The method of claim 1 wherein the aphron generator contains ethylene glycol monobutyl ether.

4. The method of claim 1 wherein after the agitating the viscosified base fluid is 10-15% aphrons by volume.

5. The method of claim 1 wherein the non-emulsifying surfactant contains diethanolamine.

6. The method of claim 1 wherein the non-emulsifying surfactant contains methanol and isopropyl alcohol.

7. A method of treating servicing mud used in downhole drillout operations at a well site where the servicing mud is circulated between above-ground equipment and a cased wellbore, the method comprising:

testing produced oil from a wellbore at a well site and produced water from the wellbore for a risk of downhole emulsions, the testing comprising:
  obtaining samples of produced oil from a wellbore and produced water from the wellbore;
  combining, in a first mixture, a first portion of the produced oil, a first portion of the produced water, a first sample of an aphron-containing aqueous fluid, and a first non-emulsifying surfactant to form a first mixture and agitating the first mixture to create a first oil-and-water emulsion;
  combining, in a second mixture, a second portion of the produced oil, a second portion of the produced water, a second sample of the aphron-containing aqueous fluid, and a second non-emulsifying surfactant to form a second mixture and agitating the mixture to create a second oil-and-water emulsion; and
  observing the first mixture until the first oil-and-water emulsion separates and the second mixture until the second oil-and-water emulsion separates;
creating a fluid lightener to add to a servicing fluid based at least in part on the observations from the testing, the creating comprising:
  providing an aqueous base fluid at the well site;
  adding a viscosifier to the base fluid to achieve low shear rate viscosity;
  adding an aphron generator to the viscosified base fluid and agitating to generate aphrons in the viscosified base fluid;
  adding the first non-emulsifying surfactant to the viscosified base fluid if the first oil-and-water emulsion separated before the second oil-and-water emulsion; and
  adding the second non-emulsifying surfactant to the viscosified base fluid if the second oil-and-water emulsion separated before the first oil-and-water emulsion; and
injecting the fluid lightener into the servicing fluid to reduce a fluid density of the servicing fluid for cleaning the cased wellbore.

8. The method of claim 7 wherein the viscosifier is xanthan gum added to the base fluid at a ratio of 0.3-0.7 lb/bbl.

9. The method of claim 7 wherein the viscosifier added to the base fluid increases the viscosity of the base fluid to approximately 50,000 cPs.

10. The method of claim 7 wherein the aphron generator is a fluid added to the viscosified base fluid at a ratio of approximately 4-10 gal/100 bbl and comprising at least 15% ethylene glycol monobutyl ether, at least 10% methanol, and at least 5% isopropyl alcohol.

11. The method of claim 7 wherein after the agitating the viscosified base fluid is 10-15% aphrons by volume.

12. The method of claim 7 wherein the first non-emulsifying surfactant contains diethanolamine.

13. The method of claim 7 wherein the first non-emulsifying surfactant is diethanolamine added to the to the viscosified base fluid at a ratio of approximately 2-10 gal/100 bbl.

14. The method of claim 7 wherein the second non-emulsifying surfactant contains methanol and isopropyl alcohol.

15. A method of treating servicing mud used in downhole drillout operations at a well site where the servicing mud is circulating between above-ground equipment and a cased wellbore, the method comprising:
  obtaining produced oil from a wellbore and produced water from the wellbore;
  providing a first non-emulsifying surfactant and a second non-emulsifying surfactant;
  creating a first oil-in-water emulsion comprising a first portion of the produced oil, a first portion of the produced water, and the first non-emulsifying surfactant;
  creating a second oil-in-water emulsion comprising a second portion of the produced oil, a second portion of the produced water, and the second non-emulsifying surfactant;
  creating a fluid lightener comprising an aqueous base fluid, a viscosifier, and an aphron generator and agitating to generate aphrons therein;
  adding either the first non-emulsifying surfactant or the second non-emulsifying surfactant to the fluid lightener based at least in part on characteristics of the first oil-in-water emulsion and characteristics of the second oil-in-water emulsion; and
  adding the fluid lightener to well servicing mud being used to drillout plugs disposed in the wellbore in a subterranean formation.

16. The method of claim 15 wherein the viscosifier is xanthan gum.

17. The method of claim 15 wherein the aphron generator contains ethylene glycol monobutyl ether.

18. The method of claim 15 and further comprising agitating the aqueous base fluid, viscosifier, and aphron generator to generate 10-15% aphrons by volume.

19. The method of claim 15 wherein the first non-emulsifying surfactant contains diethanolamine.

20. The method of claim 15 wherein the second non-emulsifying surfactant contains methanol and isopropyl alcohol.

* * * * *